United States Patent [19]
Barraco

[11] 3,891,882
[45] June 24, 1975

[54] IONIZATION GAUGE
[76] Inventor: Anthony J. Barraco, 5499 Blossom Tree Ln., San Jose, Calif. 95124
[22] Filed: Jan. 3, 1974
[21] Appl. No.: 430,598

[52] U.S. Cl. .................................. 313/7; 324/33
[51] Int. Cl. ............................................. H01j 7/16
[58] Field of Search ........................... 313/7; 324/33

[56] References Cited
UNITED STATES PATENTS
| | | | |
|---|---|---|---|
| 3,254,256 | 5/1966 | Melling et al. | 313/7 X |
| 3,388,290 | 6/1968 | Herb et al. | 313/7 X |
| 3,496,399 | 2/1970 | Buckingham et al. | 313/7 |

Primary Examiner—R. V. Rolinec
Assistant Examiner—Darwin R. Hostetter
Attorney, Agent, or Firm—John J. Leavitt

[57] ABSTRACT

Presented is a vacuum pressure ionization gauge of the thermionic type which operates in the medium to high pressure range of the vacuum spectrum. It utilizes the principal of gas ionization by means of bombarding gas molecules by electrons emitted by a heated filament. The positive ions produced are collected to provide a positive ion current which provides a measure of the pressure.

15 Claims, 5 Drawing Figures

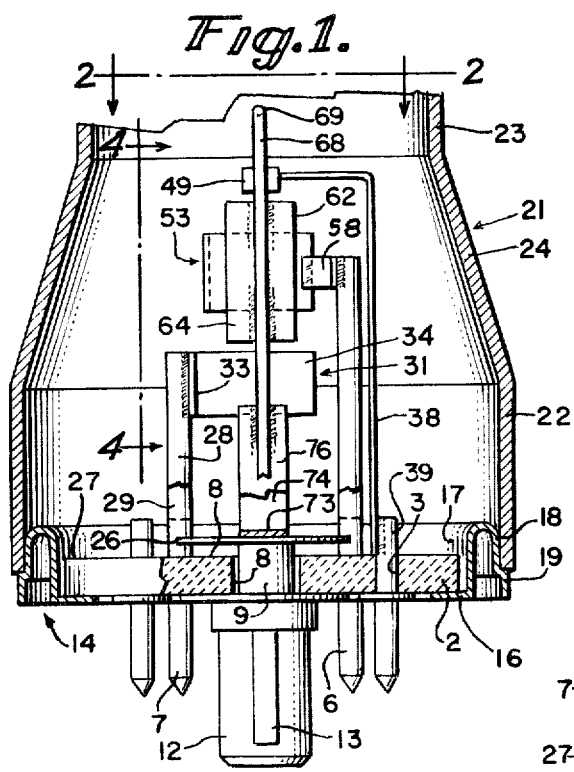
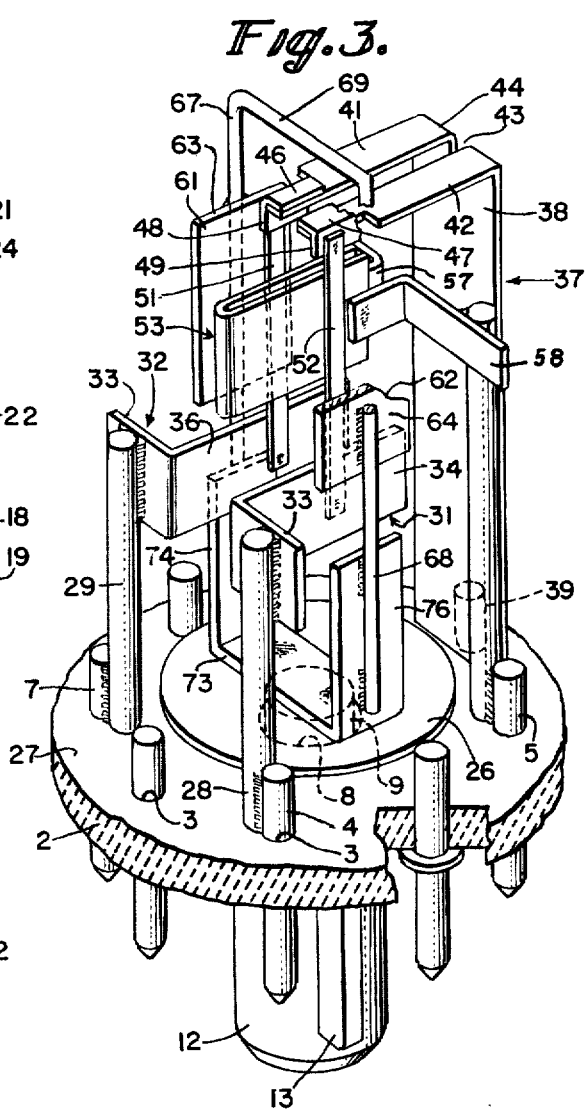
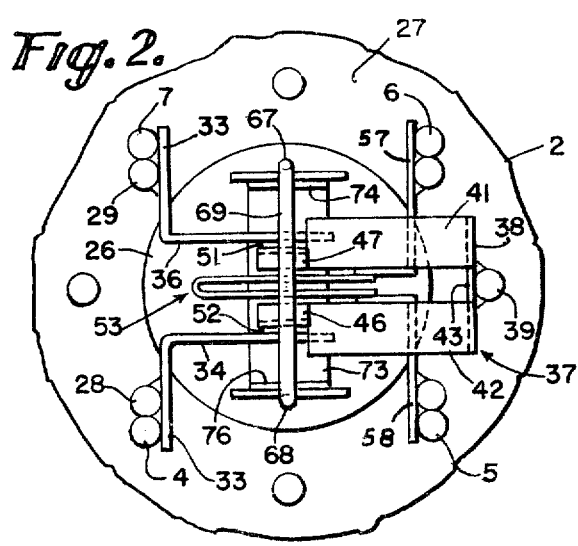
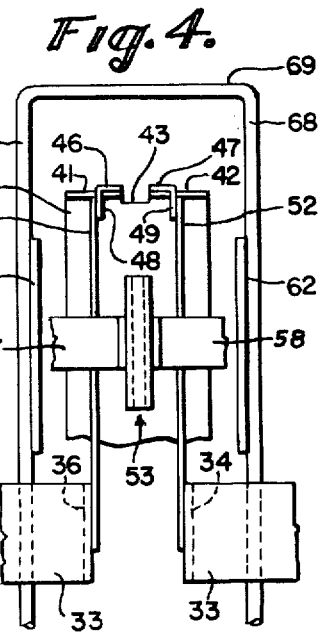
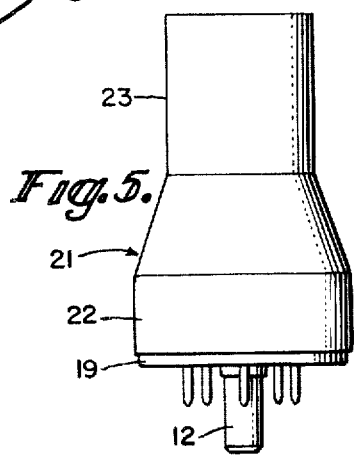

IONIZATION GAUGE

BACKGROUND OF THE INVENTION

This invention relates to ionization gauges, and particularly the type of ionization gauge known in the art as thermionic ion gauge, this name being applicable to those gauges in which the source of electrons constitutes a heated filament. The invention also relates to ionization gauges for measuring pressures in the range of about $10^{-6}$ Torr to 800 Torr. The broad concept of a thermionic ionization gauge is of course old in the art. Ionization gauges of this type are discussed in the book entitled Vacuum Technology, authored by Andrew Guthrie, and published by John Wylie and Son, Inc., at pages 142 through 181. A discussion of this type gauge can also be found in the Review of Scientific Instruments, Volume 28, No. 12, dated December 1957, pages 1051 through 1054.

As pointed out in the last mentioned article, certain principles must be met in order to produce a thermionic ionization gauge capable of measuring pressures in the range indicated. For instance, one of the principles that must be met is that the ratio of positive ion current to electron current be a linear function of pressure, and to accomplish this principle the electron paths must not change appreciably with pressure. Additionally, the efficiency of collection of positive ions must be independent of the gas pressure, and the secondary electrons produced by the ionization of gas molecules resulting from collisions with electrons must make only a negligible contribution to the measured electron current. If these stringent conditions are met, an ionization gauge can be produced which effectively measures a very wide range of pressures including high pressures and provides a linear read-out of such pressures.

Accordingly, it is one of the objects of the invention to provide a thermionic ionization gauge suitable for measurement of high pressures in the range from about $10^{-6}$ Torr to 800 Torr.

Another object of the invention is to provide a thermionic ionization gauge in which the read-out through its entire range is a linear function of the pressure and which is susceptible to digital display.

While the principles required to be met in the construction of a thermionic ionization gauge are well known, the principles have been embodied in only a limited number of commercially available thermionic ionization gauges. Accordingly, it is another object of the present invention to provide a thermionic ionization gauge that is rugged in its construction, which utilizes materials for various of its components which are selected for their efficiency of operation in the environment in question, and in which the components themselves are related one to another in such a way that high efficiency is insured.

In most conventional thermionic ionization gauges operating in the medium to high pressure range, one of the problems has been that following heating of the filament and subsequent cooling, the filament and its supports would oxidize so badly that the next time the gauge was used at lower pressures, and the filament heated, the gauge would be "gassy" as a result of reduction of the oxides that had formed on the filament and its supports. Accordingly, another object of the invention is to provide a thermionic ionization gauge that eliminates the problem of oxidation formation on the filament and its supports after each use.

Another problem that is found in conventional thermionic ionization gauges is the tendency of the filament to elongate due to thermal expansion when it is heated. Such elongation frequently causes distortion of the filament, thus altering the parallel relationship that should exist between the filament and the associated collector. Accordingly, another object of the invention is to provide a construction in which thermal elongation of the filament is accommodated by the means to which the filament is anchored.

Another problem that has been encountered in conventional thermionic ionization gauges is that at least one of the supports for the filament is conventionally fabricated from nickel in such a proportion that the nickel support tab becomes unduly heated because of its direct connection to the heated filament. After each use, the filament support tab oxidizes so that the next time the ionization gauge is used, and the filament tab reheated, the gauge would become "gassy" as a result of the reduction of the oxide coating that had occurred following the previous use. Accordingly, another object of the invention is the provision of means for anchoring a thermionic ionization gauge filament which precludes heating of the support means to a degree which will promote oxidation of the surfaces thereof.

Another component that becomes heated and which is susceptible to oxidation in a thermionic ionization gauge is the electron collector. In all known conventional gauges this component is a flat plate in close proximity to the filament and therefore receives much radiated heat from the filament with consequent oxidation. Outgassing attempts for this component have run the gamut from electron bombardment to inefficient electrical heating, neither of which have proved satisfactory. Accordingly, a still further object of the invention is to provide an ionization gauge incorporating an electron collector that may be efficiently outgassed.

The invention possesses other objects and features of advantage, some of which, with the foregoing, will be apparent from the following description and the drawings. It is to be understood, however, that the invention is not limited to the embodiment illustrated and described, since it may be embodied in various forms within the scope of the appended claims.

SUMMARY OF THE INVENTION

In terms of broad inclusion, the thermionic ionization gauge of the invention comprises an electrically insulative base through which extend a multiplicity of electrical terminals. The periphery of the base sealingly supports a hollow metal shell forming a housing for the gauge, the end of the shell remote from the base being sealably attachable to a vacuum system. Within the hollow shell housing, there are mounted a pair of filaments symmetrically disposed with respect to the longitudinal axis of the housing, and arranged in parallel relationship to one another and to an electron collector disposed between the two filaments in parallel relationship thereto. On the sides of the filaments remote from the electron collector, there are provided a spaced pair of ion collecting surfaces each of which lies closely spaced to the associated filament and in parallel relationship thereto. Means are provided connecting the filaments to the electrical terminals extending through the base so as to provide a means for energizing the filaments. Additionally, means are provided in conjunction with the support of the filaments to exert a predetermined amount of tension on the filaments to preclude their lateral displacement as a result of thermal expansion when heated. With respect to the electron collector, means are provided for mounting and connecting the electron collector in such a way that the spacing between the electron collector and the associated filaments will remain constant and so that the electron collector can be efficiently outgassed prior to its use. Additionally, the ion collecting surfaces are arranged and proportioned in relation to the associated filaments so as to maintain their close parallel spacing with the filaments and to provide an extremely large collection area in relation to the associated filament to ensure collection of all ions generated. Means are also provided constituting a shield to prevent the buildup of vaporized metal on the electrically non-conductive base of the gauge.

BRIEF DESCRIPTION OF THE DRAWINGS

FIG. 1 is a vertical cross-sectional view through the gauge, a portion of the housing being broken away to reduce its height.

FIG. 2 is a horizontal cross-sectional view taken in the plane indicated by the line 2—2 in FIG. 1. The housing and a portion of the base are broken away to reduce the size of the view.

FIG. 3 is a perspective view with the housing removed and portions of the structure broken away to reveal the internal construction of the gauge.

FIG. 4 is a fragmentary elevational view illustrating the relationship between the pair of filaments, the pair of ion collecting surfaces and the interposed electron collector.

FIG. 5 is an elevation of the gauge in completed form showing its actual size.

DESCRIPTION OF THE PREFERRED EMBODIMENT

In terms of greater detail, the thermionic ionization gauge of the invention comprises an electrically non-conductive base member 2, preferably constituted from a wafer of high content alumina ceramic. The base is preferably circular in form and is provided with a circular array of apertures 3 radially spaced from the central axis of the base, and through which apertures extend electrically conductive pin-type terminal members 4, 5, 6 and 7, each being hermetically sealed in its respective aperture in a vacuum tight manner so that a portion projects into the housing to form a mount for other components as will be explained, while another portion projects out of the envelope to form an electrical connection to related equipment such as a power source and appropriate read-out gauges.

The ceramic base is provided with a relatively large central aperture 8 through which projects the reduced-in-dimaeter portion 9 of an electrically conductive center pin 12, the external portion of which is provided with a longitudinally extending rib 13 for indexing purposes as is conventional with this type of a center pin.

To form an enclosure, the outer peripheral edge portion of the base is provided with a peripheral seal ring designated generally by the numeral 14, including a radially inwardly extending flange 16 appropriately brazed to the outside surface of the base as shown, the flange 16 being integral with an upwardly or cylindrically projecting U-shaped or re-entrant section 17 provided with a circumscribing cylindrical flange 18 swaged as shown to provide a jogged rim 19 thereon as shown. The seal ring 14 is utilized to support a tubular housing member designated generally by the numeral 21 and including a lower cylindrical portion 22 joined integrally to an upper cylindrical gauge mounting portion 23 by an intermediate conical section 24. As seen in FIG. 5, the upper cylindrical section 23 is somewhat smaller in diameter than the lower cylindrical portion 22 and forms the means by which the ionization gauge is sealed into a vacuum system utilizing a conventional 0 ring arrangement or weld.

Within the housing and rigidly mounted on the base plate 2, specifically on the inner end of the reduced-in-diameter portion 9 of the central pin, is a radially extending flat circular shield plate 26 spaced a short distance above the upper surface 27 of the base plate 2 and serving to shield the inner surface 27 of the base plate from the deposit thereon of evaporated metal from the filaments and other heated components of the assembly. The circular shield which is preferably fabricated from nickel, is appropriately spot welded concentrically on the inner end of the reduced-in-diameter section 9 of the central pin 12.

To support one or more filaments within the housing thus formed by the base, seal ring and shell 21, the terminal leads 4 and 7 project inwardly of the support plate 2 in posts 28 and 29, respectively, and supported on the upper ends of the posts are a pair of laterally spaced filament support brackets designated generally by the numerals 31 and 32. Each bracket is preferably fabricated from heavy gauge nickel and has a flange member 33 (33') appropriately spot welded to the upper end portion of the posts 28 and 29 to support the brackets so that the rearwardly projecting support flanges 34 and 36 are rigidly maintained in transversely spaced parallel relationship one with the other. From FIGS. 2 and 3, it will be noted that the filament support flanges 34 and 36 constitute cantilever beams having a considerable width in relation to their thickness, thus being capable of withstanding a considerable amount of pressure in an axial direction without deformation or displacement.

Cooperating with the support flanges 34 and 36, is a support bracket designated generally by the numeral 37 and including a downwardly projecting post portion 38 the lower end of which is appropriately spot welded to a terminal pin 39 sealed through one of the apertures 3 in base 2. The interconnection between the base end of the post 38 and the terminal pin 39 is such as to provide good electrical conduction and a rigid relationship between these two members. The upper end portion of the post 38 (FIGS. 3 and 4) constitutes a relatively wide (relative to its thickness) metal strip bent at right angles to the remainder of the post and bifurcated as shown to provide two spaced horizontal support legs 41 and 42, projecting radially inwardly of the base and spaced above the filament support flanges 34 and 36.

It will thus be noted that since the slot 43 between the bifurcated legs 41 and 42 extends past the bend 44 in the molybdenum strip, each of the separate legs 41 and 42 will have inherent resiliency with regard to an axially imposed force on the free end thereof. These cantilever type resilient legs 41 and 42 are provided at their extreme ends with a pair of nickel mounting tabs 46 and 47, each appropriately spot welded to the associated end portion of the legs 41 or 42 as shown. The mounting tabs 46 and 47 are provided with downwardly projecting filament mounting flanges 48 and 49, respectively, each of the flanges projecting downwardly toward the lower filament mounting tabs 34 and 36, and in general being in substantial alignment with the lower filament mounting tabs.

With the lower nickel mounting flanges 34 and 36 spaced below the nickel mounting tabs 48 and 49 in substantial alignment, it will be seen that a pair of vertically extending and transversely spaced filaments 51 and 52 may be disposed between the nickel tabs 48–49 and 34–36, the associated ends of the filaments being appropriately spot welded to the nickel tabs so as to maintain the filaments permanently and longitudinally oriented with relation to the longitudinal axis of the housing and equally spaced on opposite sides of the central axis. In relation to each other, the filaments are arranged in parallelism over their entire length.

It will thus be seen that the filaments 51 and 52 may be energized by imposing an appropriate flow of current therethrough, the circuit for such current flowing through the terminal pins 4, 7 and 39 and the related structure attached and supported thereby. It will also be seen that in view of the fact that legs 41 and 42 of the support post 38 are inherently resilient and each is independently mounted to the main portion of the post by virtue of the bend 44, any elongation of the filaments 51 and 52 is accommodated by the inherent resilience of the legs 41 and 42, thus maintaining an appropriate tension on each of the filaments 51 and 52 so that lateral distortion of the filaments does not occur as a result of heating and thermal elongation thereof.

Additionally, it will be noted that the relative sizes of the filament support tabs 34 and 36 in relation to the filaments 51 and 52 is such that the mass of the tabs prevents the tabs from being heated by the attached filament to a point that will cause oxidation of the tabs when the gauge is operated in relatively high pressure vacuum containing large amounts of oxygen or other compound forming gases. The advantage of this construction is that the next time the ionization gauge is energized in vacuum at lower pressures than previously encountered, the interior of the gauge will not be gassy because of the cleaning effect or reduction of the oxides caused by reheating of the tabs 34 and 36. From the foregoing it will thus be seen that regardless of the intensity to which the filaments are heated, they will maintain their parallelism through the entire energization cycle.

As indicated above, in order to maintain ionization current linearity at high pressures and increase the sensitivity of the ionization gauge, it is important to make the distance between the filaments 51 and 52 and an associated electron collector small and constant, so that the application of a low electron accelerating voltage to the associated electron collector will have maximum effect. Accordingly, in the preferred embodiment illustrated, there is provided an electron collector disposed symmetrically between the two filaments and designated generally by the numeral 53 and comprising preferably a strip of molybdenum bent into a U-shaped configuration having one leg 54 of the strip spaced closely adjacent the filament 51 intermediate its ends and lying parallel thereto, while the other leg 55 of the strip is closely positioned adjacent the filament 52 and lies parallel thereto. The ends of the U-shaped electron collector strip remote from the bend 56 therein that forms the two spaced legs thereof are appropriately spot welded to relatively heavy gauge associated support tabs 57 and 58, the support tab 57 being in turn electrically conductively spot welded to a terminal post 6, while the tab 58 is similarily associated with the terminal post 5. It will thus be seen that a low electron accelerating voltage may be applied to the U-shaped electron collector member 53 by imposing the appropriate potentials on the terminal posts 5 and 6.

Another advantage of this construction is that the electron collector may be efficiently outgassed by impressing sufficient power thereon to effect electrical heating of the U-shaped strip to reduce any oxides that have formed thereon. In this respect, the molybdenum or other metal strip is thin and small in cross-section in relation to the conductive tabs on which it is supported, and the split U-shaped legs provide a continuous path for the flow of a heating electrical current through the electron collector. Additionally, lateral displacement of the U-shaped strip due to thermal expansion is precluded because the tendency will be for the strip to expand uniformally in the direction of the bend.

With respect to collection of ions that result from collisions of electrons emanating from the filaments with gas molecules within the ionization gauge, and more specifically in and around the filaments 51 and 52, it is important that the surface on which the ions are to be collected be large in relation to the associated filament. Additionally, it is important that the efficiency of ion collection not change with pressure, and for this reason it is important that the relationship between the ion collecting surface and the filament remain constant during the operation of the ionization gauge.

To accomplish these purposes, there is provided a pair of ion collcting surfaces 61 and 62 associated adjacent to and parallel with the associated filaments 51 and 52. From FIGS. 3 and 4 it will be seen that the ion collecting surfaces 61 and 62 are extremely large in comparison to the associated filaments, and it will also be seen that with respect to the longitudinal dimension of the filament, the ion collecting surfaces 61 and 62 extend for a considerable distance transversely of that dimension, while the lengths of the ion collecting surfaces 61 and 62 in relation to the lengths of the filaments, extend parallel to and lie directly opposite a major portion of the filaments. It will thus be seen that a portion of the molecules of gas existing in the space between each of the filaments and its associated ion collecting surface will, upon bombardment by electrons emitted from the filaments, be ionized with the resultant ions being effectively collected on the ion collecting surface 61 and 62. Accordingly, it can be said that the relative surface areas of the filaments and the ion collecting surfaces, and their juxtaposition with respect to each other, will result in substantial collection of all of the ions at all pressures at which the ionization gauge may be used.

From a mechanical point of view, it is important that the ion collecting surfaces 61 and 62 remain stable in relation to the associated filaments. Accordingly, ion collecting surfaces 61 and 62 form surfaces on generally rectangular metal tabs 63 and 64, respectively, the tabs being appropriately spot welded on opposite legs 66 and 67, respectively, of an inverted U-shaped bracket having a cross member 69 forming the base of the U and connecting the legs 67 and 68, with the normally free end portions 71 and 72 of the legs being appropriately spot welded to the bracket 73 which is in turn spot welded to the shield plate 26 supported on the central pin 9. As seen in FIG. 3, bracket 73 is provided with a pair of upstanding spaced and parallel legs 74 and 76 which project upwardly a sufficient distance to provide adequate support for the legs 67 and 68.

As previously stated, it is important that an accelerating voltage be applied to the ion collecting surfaces 61 and 62, and for this purpose there is a continuous electrical path between the conductive center pin 12, the reduced-in-diameter portion 9 thereof, the shield plate 26, the U-shaped bracket 73, and the ion collecting surface supporting legs 67 and 68. Accordingly, it will be seen that because of the relationship between the electron collector 53 and the associated filaments on opposite sides thereof, the electric field generated by this configuration of electron collector will cause the electrons to move in essentially straight lines between each filament and the electron collector. Accordingly, the electron paths will be well defined and will not change appreciably with pressure. Additionally, it will be seen that the ion gauge sensitivity will be small compared to the reciprocal of the highest pressure to be measured by virtue of the fact that the distances between the filaments 51 and 52 and the associated surfaces of the electron collector are exceedingly small, whereby only a very low electron accelerating voltage need be applied. While the filaments have been illustrated and described as connected in parallel, it should be understood that the filaments could be arranged in series, or by slight modification, could be independently energized. In like manner, while the electron collector is shown connected to two terminals to permit $I^2R$ heating of the electron collector for outgassing purposes, it should be understood that for performance of the electron collection function, it need be connected only to one terminal lead. In like manner, the ion collectors may be electrically isolated from one another and may be of different sizes. Thus, it is contemplated that only one-half of the gauge may be energized at any given time by appropriate isolation of the filament, electron collector and ion collector components.

Having thus described the invention, what is claimed to be novel and sought to be protected by letters patent is as follows:

1. A thermionic ionization gauge comprising:
    a. a base;
    b. a plurality of terminal leads extending through said base;
    c. a pair of thermionic filaments mounted on said base and electrically connected between a pair of said terminal leads whereby an energizing potential may be applied thereto to energize said filaments;
    d. an electron collecting member disposed between said filaments and electrically connected to at least one of said terminal leads whereby an electron accelerating voltage may be applied thereto; and
    e. a pair of ion collecting surfaces disposed adjacent said pair of filaments, one each of said ion collecting surfaces being disposed in association with one of said filaments on the side thereof remote from said electron collector, said ion collecting surfaces being electrically connected to one of said terminal leads whereby an ion accelerating voltage may be applied thereto.

2. The combination according to claim 1, in which means are provided connected to said filaments to impose longitudinal tension thereon in all attitudes thereof whereby thermal elongation of the filaments is accommodated by the inherent resilience of said connecting means to preclude lateral displacement of the filaments as a result of said thermal elongation.

3. The combination according to claim 1, in which said electron collector is symmetrically disposed between said pair of filaments whereby thermal expansion of said electron collector causes growth in a direction longitudinally of the electron collector in relation to its mount whereby the electron collecting characteristic of the electron collector member will remain constant in all attitudes thereof.

4. The combination according to claim 1, in which said ion collecting surfaces are large in relation to the surfaces of said filaments, each said ion collecting surface being juxtaposed over a major portion of the length of the associated filament and having a width with respect to the transverse dimension of said filament orders of magnitude greater than the transverse dimension of the filament whereby said ion collecting surfaces will be effective to collect substantially all of the ions in the immediate vicinity of said ion collecting surfaces.

5. The combination according to claim 1, in which means are provided supported on said base for anchoring one end of said pair of filaments, said means with respect to each filament comprising a metal flange having a thickness orders of magnitude greater than the thickness of said filament, and having a width dimension extending in the direction of the longitudinal dimension of the filament to constitute a cantilever beam to which the associated free end of which the filament is spot welded and which is highly resistant to displacement by tension applied to the associated filament and highly resistant to heating so that oxidation will not form thereon after each use.

6. The combination according to claim 1, in which said base is generally symmetrical about a central axis extending longitudinally of said thermionic gauge, said pair of filaments extend substantially parallel to said longitudinal axis and are positioned diametrically on opposite sides thereof, said electron collector being disposed between said spaced filaments, while said ion collecting surfaces are diametrically spaced on opposite sides of said central axis outboard of said filaments and parallel thereto and to said central axis.

7. The combination according to claim 1, in which a housing is provided mounted on said base and surrounding said filaments, electron collector and ion collecting surfaces.

8. The combination according to claim 1, in which shield means are provided supported on said base to collect evaporated metal thereon and prevent its deposition on said base.

9. The combination according to claim 1, in which said base is formed from an electrically non-conductive ceramic material.

10. The combination according to claim 1, in which said pair of spaced thermionic filaments are arranged to be electrically connected in parallel to a source of energizing potential.

11. The combination according to claim 1, in which said electron collector comprises an elongated strip of very thin molybdenum in the order of 0.002 inch folded intermediate its ends to produce a U-shaped configuration the ends of which are electrically connected in series to a pair of said terminal leads whereby an electrical current may selectively be caused to flow serially through said leads and said electron collector serially interposed therebetween to heat the electron collector to effect outgassing.

12. The combination according to claim 1, in which said means supporting said filaments include a pair of lower anchor flanges constituting cantilever beams to the free ends of which the lower ends of said filaments are welded, and a pair of inherently resilient upper anchor legs spaced from said lower anchor flanges and to which the upper ends of said filaments are welded, whereby each of said filaments is individually tensioned in the direction of its longitudinal dimension to preclude lateral displacement thereof.

13. In a thermionic ionization gauge for measuring vacuum pressures in the order of $10^{-6}$ Torr, the combination comprising:
   a. at least one elongated filament mounted so that any thermal elongation thereof is accomodated so as to prevent lateral displacement of any part of the filament;
   b. an electron collector mounted in spaced relationship with said elongated filament whereby thermal expansion of the electron collector occurs in a direction which does not alter the spaced relationship thereof with the associated filament;
   c. at least one ion collector mounted in spaced relationship with said elongated filament on the side thereof opposite said electron collector, the width of said ion collector being orders of magnitude greater than the width of said filament, and the length of said ion collector being almost as long as said filament; and
   d. means physically joining and electrically isolating said filament, electron collector and ion collector so that separate electrical potentials may be selectively applied thereto.

14. The combination according to claim 13, in which said elongated filament is formed from a ribbon having a width dimension orders of magnitude greater than the thickness thereof, and arranged so that its broad sides lie parallel to said electron collector and ion collector.

15. The combination according to claim 13, in which said electron collector comprises an elongated strip of molybdenum having a thickness in the order of 0.002, said strip being folded intermediate its ends to produce a U-shaped configuration the ends of which are serially connected between said source of potential and ground.

* * * * *